US011273725B2

(12) United States Patent
Blanc et al.

(10) Patent No.: US 11,273,725 B2
(45) Date of Patent: Mar. 15, 2022

(54) ASSEMBLIES OF A VEHICLE POSITIONING SYSTEM, SYSTEM, USE AND METHODS

(71) Applicant: TDK Electronics AG, Munich (DE)

(72) Inventors: Charly Blanc, Zuchwil (CH); Markus Schär, Rüttenen (CH)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 16/861,881

(22) Filed: Apr. 29, 2020

(65) Prior Publication Data

US 2020/0339000 A1    Oct. 29, 2020

(30) Foreign Application Priority Data

Apr. 29, 2019   (DE) .................. 102019110998.1

(51) Int. Cl.
| | | |
|---|---|---|
| *B60L 53/35* | (2019.01) | |
| *H02J 50/90* | (2016.01) | |
| *H02J 50/40* | (2016.01) | |
| *H02J 50/20* | (2016.01) | |
| *H01F 38/14* | (2006.01) | |

(Continued)

(52) U.S. Cl.
CPC .............. *B60L 53/35* (2019.02); *G06N 3/08* (2013.01); *G06N 3/10* (2013.01); *H01F 38/14* (2013.01); *H02J 50/10* (2016.02); *H02J 50/20* (2016.02); *H02J 50/40* (2016.02); *H02J 50/90* (2016.02)

(58) Field of Classification Search
CPC . B60L 53/35; H02J 50/90; H02J 50/40; H02J 50/20; H02J 50/10; H02J 50/402; H01F 38/14; G06N 3/10; G06N 3/08; G06N 3/006; Y02T 10/7072; Y02T 90/12; Y02T 10/70; H04W 4/40

See application file for complete search history.

(56) References Cited

U.S. PATENT DOCUMENTS

| | | | | |
|---|---|---|---|---|
| 5,548,512 A | * | 8/1996 | Quraishi | G05D 1/0255 701/23 |
| 6,720,920 B2 | * | 4/2004 | Breed | G01S 17/89 342/386 |

(Continued)

FOREIGN PATENT DOCUMENTS

| | | |
|---|---|---|
| DE | 102014224455 A1 | 6/2016 |
| DE | 112016007231 T5 | 7/2019 |

(Continued)

OTHER PUBLICATIONS

Wikipedia contributors. "Artificial neural network." Wikipedia, The Free Encyclopedia. Wikipedia, The Free Encyclopedia, May 12, 2021. Web. May 22, 2021. (Year: 2021).*

(Continued)

*Primary Examiner* — Daniel Cavallari
(74) *Attorney, Agent, or Firm* — Slater Matsil, LLP

(57) ABSTRACT

Assemblies of a vehicle positioning system, system and method thereof are disclosed. In an embodiment a ground assembly for a vehicle positioning system includes a first ground assembly antenna, wherein the ground assembly is configured to function together with a vehicle assembly of the vehicle positioning system to determine a position of the vehicle assembly relative to the ground assembly, and wherein a determination of the position is performed by utilizing a neural network.

20 Claims, 4 Drawing Sheets

(51) Int. Cl.
*G06N 3/10* (2006.01)
*G06N 3/08* (2006.01)
*H02J 50/10* (2016.01)

(56) References Cited

U.S. PATENT DOCUMENTS

| | | |
|---|---|---|
| 2018/0089566 A1 | 3/2018 | Li et al. |
| 2019/0252923 A1 | 8/2019 | Hemphill et al. |
| 2019/0381891 A1* | 12/2019 | Moghe .............. B60L 53/35 |
| 2020/0203995 A1* | 6/2020 | Osada .............. H02J 50/402 |

FOREIGN PATENT DOCUMENTS

| | | | |
|---|---|---|---|
| WO | 2005032189 A1 | 4/2005 | |
| WO | WO-2020142036 A1 * | 7/2020 | ............ G05D 1/102 |

OTHER PUBLICATIONS

Wikipedia contributors. "Artificial neuron." Wikipedia, The Free Encyclopedia. Wikipedia, The Free Encyclopedia, Mar. 19, 2021. Web. May 22, 2021. (Year: 2021).*

Chih-Yung Chen, et al., "A Six-Antenna Station Based Indoor Positioning System," 2013 2nd International Symposium on Instrumentation and Measurement, Sensor Network and Automation (IMSNA), IEEE, Dec. 23-24, 2013, pp. 919-921.

Esmond Mok, et al., "An Improved Neural Network Training Algorithm for Wi-Fi Fingerprinting Positioning," ISPRS International Journal of Geo Information, www.mdpi.com/journal/ijgi/, Sep. 3, 2013, pp. 854-868.

Hamid Mehmood, et al., "Indoor Positioning System Using Arlilicial Neural Network," Journal of Computer Science, 2010, pp. 1219-1225.

Michal Meina, et al., "Lessons Learnt from Designing Indoor Positioning System Using 868MHz Radios and Neural Networks," Proceedings of the Federated Conference on Computer Science and Information Systems, IEEE, Sep. 13-16, 2015, pp. 101-107.

* cited by examiner

ASSEMBLIES OF A VEHICLE POSITIONING SYSTEM, SYSTEM, USE AND METHODS

CROSS-REFERENCE TO RELATED APPLICATIONS

This application claims priority to German Patent Application No. 102019110998.1, filed on Apr. 29, 2019, which application is hereby incorporated herein by reference.

TECHNICAL FIELD

The present invention refers to the field of positioning systems for vehicles. In particular, the invention refers to positioning systems for electric vehicles that need a wireless power supply.

BACKGROUND

Vehicle positioning systems should provide position information of a vehicle. Position information can be used to evaluate a vehicle's environment or to provide guiding information to find specific places efficiently.

Electric vehicles are vehicles, e.g. cars, tractors, vans, transporters, goods vehicles of any kind, etc., that use electric energy stored in a rechargeable battery establishing the main power source of the vehicle. When the vehicle's electric energy is exhausted then a recharge of the battery is needed. Electric energy can be transferred via a galvanic connection, e.g. an electric cable, between the vehicle and a power source. However, electric energy can also be provided wirelessly. WPT systems (WPT=Wireless Power Transfer) can provide power without the need for an electric cable. WPT systems usually have a primary coil for transmitting energy, e.g. magnetic energy, and a secondary coil for receiving energy. For a high efficiency and for reducing or preventing energy from being deposited away from the secondary coil a sufficiently small horizontal distance is wanted.

Thus, a vehicle positioning system shall provide sufficiently precise position information.

It is possible to use an RF antenna at a ground assembly (GA) of the system and an RF antenna at a vehicle assembly (VA) of the system. A signal is emitted from the antenna on the VA and received by the antenna on the GA. Measurements are taken on a grid for different horizontal (x and y) positions of the VA and saved on a look-up table, which is commonly referred to as "map." Each data point coming from the antennas is compared to each point on the map, and the root mean square error is computed to estimate a "best" position of the vehicle based on the smallest calculated error.

Such systems are known, e.g., from the contributions:

"An Improved Neural Network Training, Algorithm for Wi-Fi Fingerprinting Positioning" (Cheung, E. M. Hong Kong, China: ISPRS (2013));

"A Six-Antenna Station Based Indoor Positioning System" (Chih-Yung Chen, T.-H. L.-C. Kaohsiung City, Taiwan: IEEE (2013));

"Indoor Positioning System Using Artificial Neural Network" (Hamid Mehmood. N. K. Pathumthani, Thailand: Journal of Computer Science (2010)); or "Lessons Learnt From Designing Indoor Positioning System Using 868 MHz Radios and Neural Networks" (Michal Meina, B. C. Warsaw, Poland: IEEE (2015)).

However these solutions may not reach accuracy in the cm range. It would be desired to have accuracy in the cm range. Thus, it is desired to have alternative solutions, specifically alternative solutions providing improved positioning accuracy.

SUMMARY

Embodiments provide improved assemblies for improved positioning systems.

It is possible that the ground assembly of a vehicle positioning system comprises a first ground assembly antenna. The ground assembly can be provided and suited to function together with the corresponding vehicle assembly. The ground assembly and the vehicle assembly establish the assemblies of a corresponding vehicle positioning system. The vehicle positioning system can be provided and suited to determine a position of the vehicle assembly relative to the ground assembly. The determination of the position is performed utilizing a neural network.

Correspondingly, it is possible that a vehicle assembly of the vehicle positioning system comprises a first vehicle assembly antenna. Similar to the ground assembly described above, the vehicle assembly can be provided and suited to function together with the ground assembly of the vehicle positioning system to determine a position of the vehicle assembly relative to the ground assembly. The determination of the position can be performed utilizing a neural network.

The vehicle assembly and the ground assembly can establish central elements of a vehicle positioning system. The determination of the position is performed utilizing a neural network.

The neural network can be implemented as part of the ground assembly, as part of the vehicle assembly or as part of a third, external circuit assembly.

Correspondingly, it is possible that one of the assemblies, e.g. the ground assembly and/or the vehicle assembly comprises a computer system providing the neural network.

It is possible that the computer system is an embedded system.

The neural network can be provided in hardware. Then, the computer system comprises the correspondingly needed neural network circuit elements.

However, it is also possible that the neural network is implemented in software and the computer system implements the neural network's elements as data structures represented in a memory of the computer system.

An embedded system can be realized as a microcontroller programmed and controlled by a real-time operating system with provision of the neural network's functionality as a dedicated function. The embedded system is embedded within the ground assembly, within the vehicle assembly or, in general, within the positioning system.

The first ground assembly antenna can be used to emit signals. The first vehicle assembly antenna can be used to receive the signals.

As an alternative, it is possible that the first vehicle assembly antenna emits a corresponding a signal and the first ground assembly receives the signal. The neural network can be used to evaluate the received signal and to provide position information regarding the position of one of the two assembles relative to the respective other assembly.

The ground assembly can be placed at a fixed position in an arbitrary environment. The vehicle assembly can be attached to a corresponding vehicle. The vehicle may need to visit the ground assembly's place, e.g. for wireless power transfer.

However, the received signals may strongly depend on the assembly's environments and a conventional lookup table may—due to possible ambiguities of the received signals—provide a proposed positioning information that drastically deviates from the real position.

However, the provision of the neural network for evaluating one or an iteration of received signals significantly reduces inaccuracies and the quality of the proposed position signals is strongly enhanced.

It is possible that the neural network is a trained neural network. The training can include learning processes related to the general setup of the ground assembly and the general setup of the vehicle assembly.

Also, it is possible that the training includes considering the environment of the ground assembly and/or the environment of the vehicle assembly.

Compared to the use of the "map" as described above, the computational effort in utilizing a trained neural network is also significantly reduced.

A reduced computational effort is especially appreciated when an embedded system that should have low power consumption is used.

It is possible that the assembly, e.g. the ground assembly and/or the vehicle assembly, further comprises one, two, three or four additional antennas. The ground assembly can comprise one, two, three or four additional ground assembly antennas. The vehicle assembly can comprise one, two, three or four additional vehicle assembly antennas.

The use of a single ground assembly antenna in combination with a single vehicle assembly antenna has the advantage that a small amount of data needs to be processed by the neural network. It may be possible that the use of one antenna at each side of the positioning system is sufficient to provide a distance between the two assemblies with high accuracy when a neural network is used to evaluate the signals.

However, in addition to the pure distance between the assemblies, information concerning a horizontal overlap and information concerning the orientation of one assembly relative to the respective other assembly may also be advantageous.

By providing two or more antennas at the ground assembly and/or two or more antennas at the vehicle assembly information concerning the relative orientation can be gained. However, the complexity of the data processing is increased. However, the use of a neural network provides a good trade-off between power consumption, distance accuracy, orientation accuracy and computation time.

In a preferred form of the positioning system the vehicle assembly has one vehicle assembly antenna and the ground assembly has four ground assembly antennas. The vehicle assembly antenna emits a signal that is received by the four ground assembly antennas and the neural network is implemented at the side of the ground assembly where a permanent power connection to an external power source can be present and provide the hardware of the computer system.

The vehicle assembly antenna can have different distances to the corresponding ground assembly antennas such that the received signals at the ground assembly antennas are typically different from one another. This enables the neural network to determine the distance between the vehicle assembly and the ground assembly, e.g. between a center of the vehicle assembly and a center of the ground assembly. In addition, such a configuration allows to also determine the orientation of the ground assembly relative to the vehicle assembly. To that end, the emission characteristics of the vehicle assembly antenna can have a directional dependence.

It is possible that the ground assembly antennas and the vehicle assembly antennas are magnetic antennas. The magnetic antennas can have an operating frequency in a range between 50 kHz and 150 kHz.

Thus, it is possible that the vehicle assembly antenna emits a magnetic signal that is received by the ground assembly antennas. Specifically, the ground assembly antennas can determine a magnetic field strength of the magnetic field emitted by the vehicle assembly antenna at the position of the respective ground assembly antennas.

The received magnetic field strengths at the positions of the ground assembly antennas can be used as an input signal for the neural network. The neural network processes the received magnetic field strengths and proposes a relative position and/or a relative orientation between the two assemblies. Compared to lookup table-based systems utilizing RF signals for positioning determination, the use of magnetic information in combination with processing by a neural network strongly enhances accuracy concerning distance, accuracy concerning orientation and power consumption due to a reduced computational time.

It is possible that an assembly, e.g. the ground assembly and/or the vehicle assembly, further comprises an RF antenna.

The RF antenna can be used to provide a corresponding position, orientation and/or guidance signal, e.g. from the ground assembly to the vehicle assembly, for guiding the vehicle assembly to the correct position at the ground assembly, e.g. for wireless power transfer.

The RF antennas of the two assemblies can work in an RF frequency range with electromagnetic signals, e.g. utilizing Bluetooth signals, communication systems of a GSM system, of a LTE system, of a 5G communication system, of a Wi-Fi system or of a similar data communication system utilizing electromagnetic RF signals.

It is possible that the neural network provides a best position information based on a Levenberg-Marquardt optimization. Such an optimization can be used during training to process the input information of the neural network in a power and time-efficient manner in a first layer. In a second layer PSO (particle swarm optimization) can be used for global optimization.

Global optimization is necessary in order to be able to find a globally valid base estimation of the position in the xy-plane. Otherwise a local optimum may be regarded as the actual position that deviates from the real position that corresponds with a different local optimum at a different horizontal position.

The Levenberg-Marquardt optimization uses the Levenberg-Marquardt algorithm, also known as the damped least-squares method that is used to solve non-linear least squares problems. The Levenberg-Marquardt optimization can be used for multi-dimensional curve fitting.

The neural network can have a plurality of cascaded stages. Each stage has one or more input nodes and at least one output node and a signal comparator between the input nodes and the output node. The internal settings of each stage, e.g. the internal signal conductance from the input nodes to the output nodes and the provision of the corresponding output signal at the output node establish a corresponding number of freedoms that contribute to the number of dimensions of the multi-dimensional curve fitting for which the global optimum is wanted.

When each stage provides n degrees of freedom and the neural network has m stages cascaded in series between an input and an output of the neural network then the number of dimensions of the multi-dimensional curve fitting is n×m.

The training of the neural network involves finding optimal values for the internal settings of the stage. Thus, the training essentially includes finding the optimal n×m internal settings of the neural network that determine the signal processing between the input and the output of the neural network.

As stated above, the assemblies can be assemblies of a WPT system. Correspondingly, it is possible that the assembly can comprise a primary coil or a secondary coil. In particular, when the assembly is a ground assembly then the assembly can comprise a primary coil. When the assembly is a vehicle assembly then the assembly can comprise a secondary coil.

Power can be transferred from the primary coil to the secondary coil when the WPT system is active.

The primary coil or the secondary coil can be selected from a spiral coil and a DD coil (double D coil).

It is preferred that the primary coil and the secondary coil are of the same coil type.

A spiral coil can have a rotational invariance. This means that the orientation of the secondary coil with respect to the primary coil may be of secondary importance as long as the two coils have a sufficiently large horizontal overlap.

However, when DD coils are used then—in addition to a close horizontal proximity—the correct orientation of the coils is necessary.

Further, the corresponding vehicle positioning system is provided. The vehicle positioning system comprises a ground assembly and a vehicle assembly. The ground assembly and the vehicle assembly can be as described above.

Further, the vehicle assembly can be used for guiding one or more electric vehicles to a ground assembly, e.g. for wireless power transfer.

In various embodiments a method of guiding a vehicle assembly into a vicinity of a ground assembly, wherein the vehicle assembly and the ground assembly can be as described above, can comprise one or more steps selected from: using the neural network for close field magnetism triangulation, or using the neural network as a data approximation function.

The close field magnetism triangulation determines a distance and/or an orientation based on the different magnetic field strengths determined by the receiver antennas of the system.

In various further embodiments the use of the neural network as a data approximation function involves utilizing the magnetic field strengths as input signals for the neural network. The neural network has been trained such that the internal settings of the stages are such that a best position and/or a best orientation is proposed at the output of the neural network.

In other embodiments a method of training an assembly as described above comprises one or more steps selected from: training the neural network utilizing a Levenberg-Marquardt optimization, and performing a global optimization using a PSO.

BRIEF DESCRIPTION OF THE DRAWINGS

Central aspects of the assemblies and details of preferred embodiments are shown in the accompanying schematic figures.

In the Figures.

DETAILED DESCRIPTION OF ILLUSTRATIVE EMBODIMENTS

Figure 1:
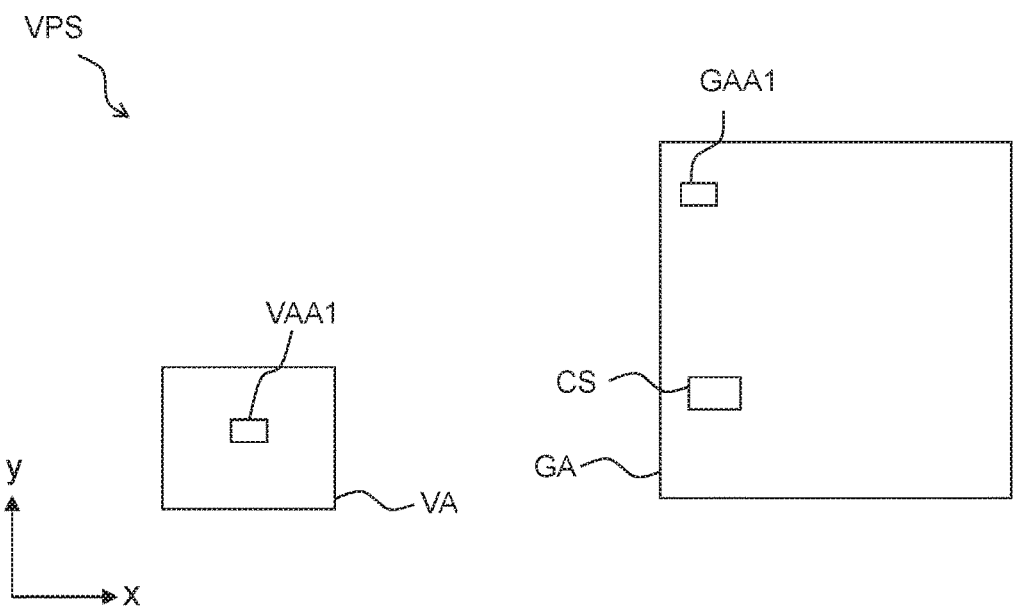
FIG. 1 shows elements of a vehicle positioning system.

FIG. 1 shows selected details of a vehicle positioning system VPS. The vehicle positioning system VPS comprises a vehicle assembly VA and a ground assembly GA. The vehicle assembly has a first vehicle assembly antenna VAA1. The ground assembly GA has a first ground assembly antenna GAA1 and a computer system CS.

The computer system CS does not necessarily have to be implemented in the ground assembly. The computer system CS can also be an element of the vehicle assembly VA.

Via the antennas VAA1 and GAA1 a distance between the vehicle assembly and the ground assembly or between the assemblies' antennas can be determined.

Figure 2:
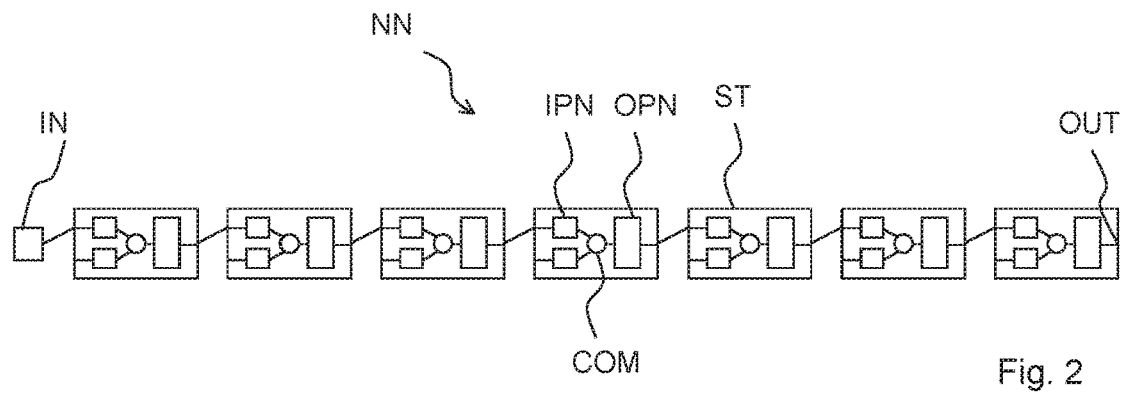
FIG. 2 shows cascaded stages of the neural network.

The determination can take place utilizing a neural network. FIG. 2 illustrates stages ST of the neural network NN. The neural network NN comprises a plurality of stages ST cascaded between an input IN and an output OUT. A stage ST can comprise one or more input nodes IPN and one or more output nodes OPN. A comparator COM is connected between the input nodes IPN and the output node OPN. The internal settings of the stages ST determine the data processing between the input IN and the output OUT such that for a specific input information at the input IN, e.g. magnetic field strengths of four ground assembly antennas and the output signal, e.g. x and y coordinates and an orientation between the assemblies is determined.

Figure 3:
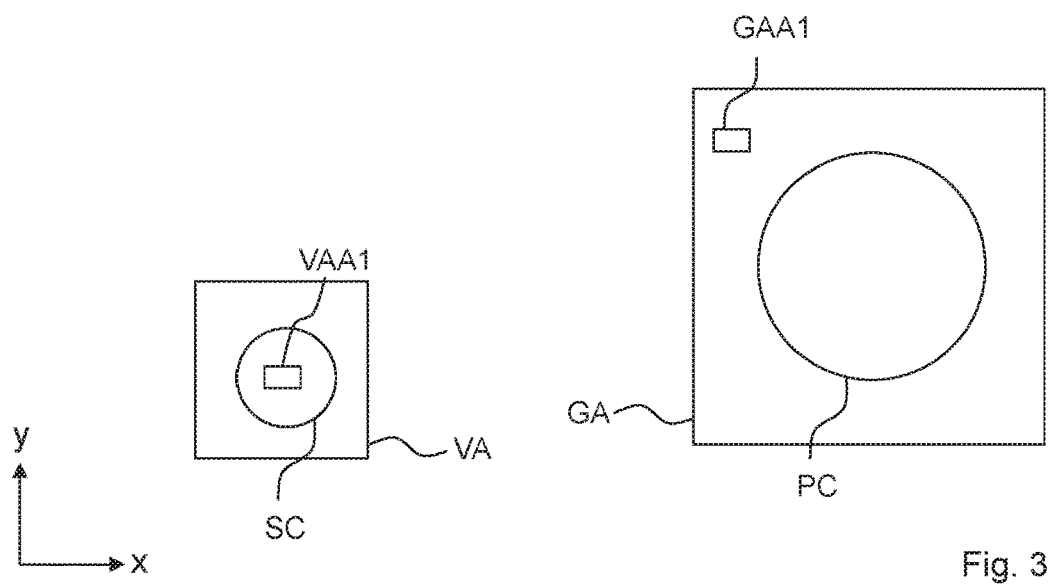
FIG. 3 shows a primary and a secondary coil.

FIG. 3 shows the use of a round primary coil and of a round secondary coil. The coils extend with their windings in the xy plane and power transfer can take place when the primary coil PC and the secondary coil SC are horizontally aligned. Typically, the secondary coil is placed at a position between 1 cm and 50 cm above the vertical position of the primary coil PC for a good power transmission efficiency.

Figure 4:
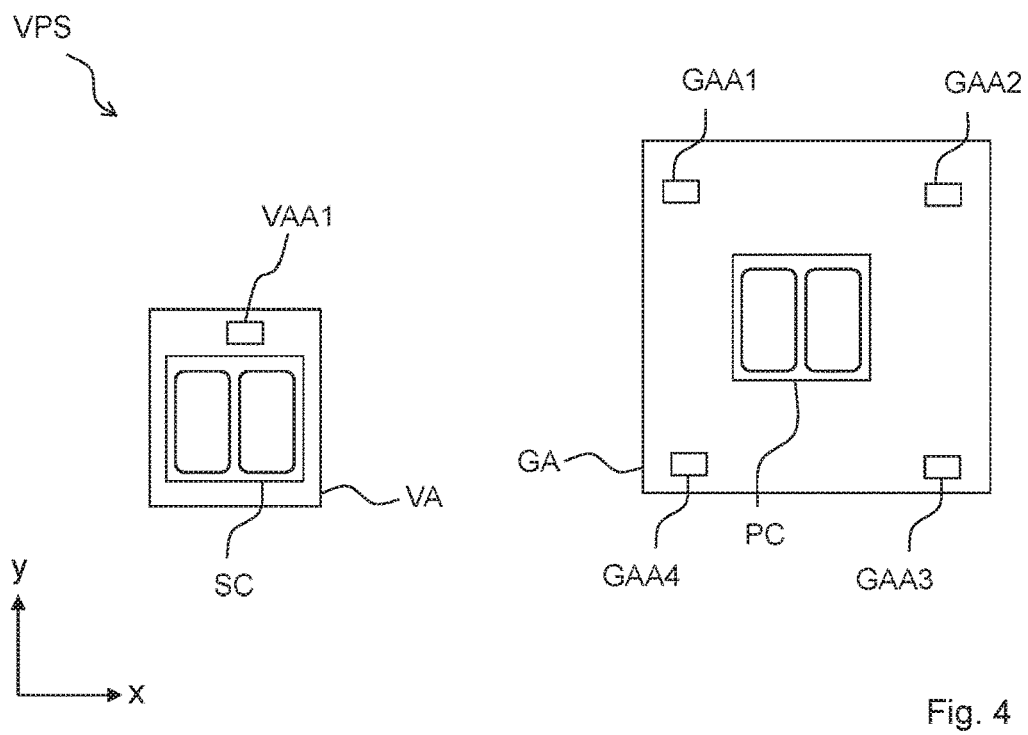
FIG. 4 shows the use of DD coils.

FIG. 4 illustrates the use of a DD coil as a primary coil PC at the ground assembly GA and of a DD coil as the secondary coil SC at the vehicle assembly. While an orientational offset is unimportant in the case of coils having a circular symmetry, the use of DD coils makes a precise alignment of the orientation of the vehicle assembly VA relative to the ground assembly GA in addition to a matching horizontal position necessary.

Correspondingly, additional ground assembly antennas GAA2, GAA3 and GAA4 at the ground assembly GA are provided such that the orientation in addition to the distance can be determined by the neural network.

Figure 5:
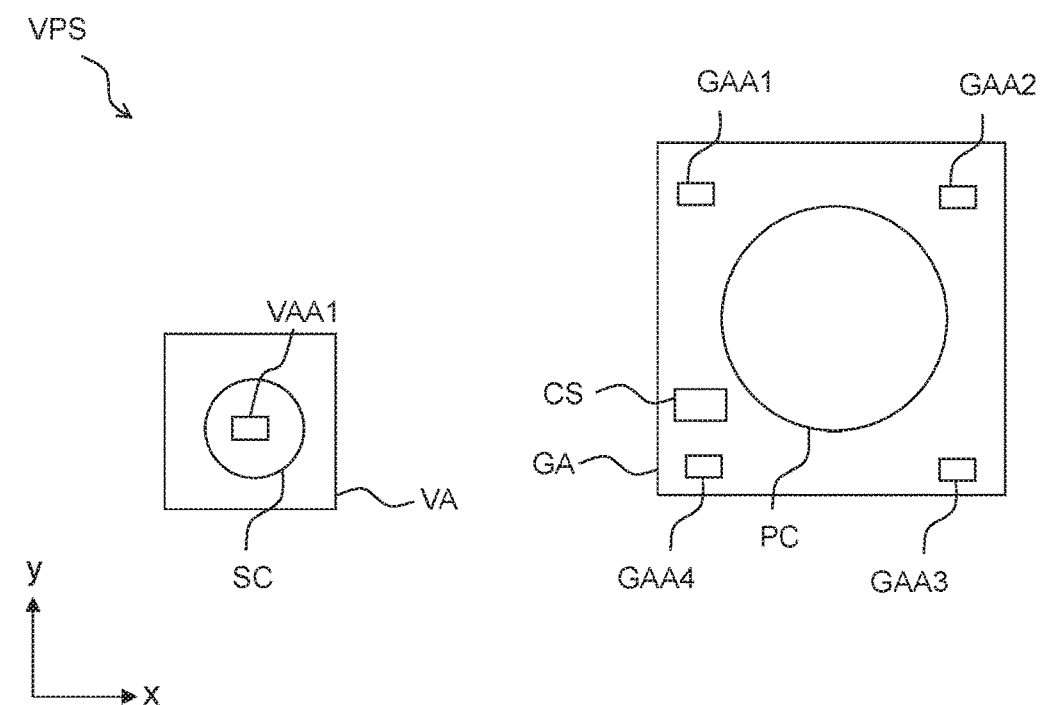
FIG. 5 shows the use of four ground assembly antennas.

FIG. 5 illustrates the use of four ground assembly antennas when a spiral primary coil PC is used. The use of four ground assembly antennas does not only provide the possibility of determining an orientation but further provides an improved accuracy in determining the distance between a center of the secondary coil SC of the vehicle assembly relative to the center of the primary coil PC of the ground assembly GA.

Figure 6:
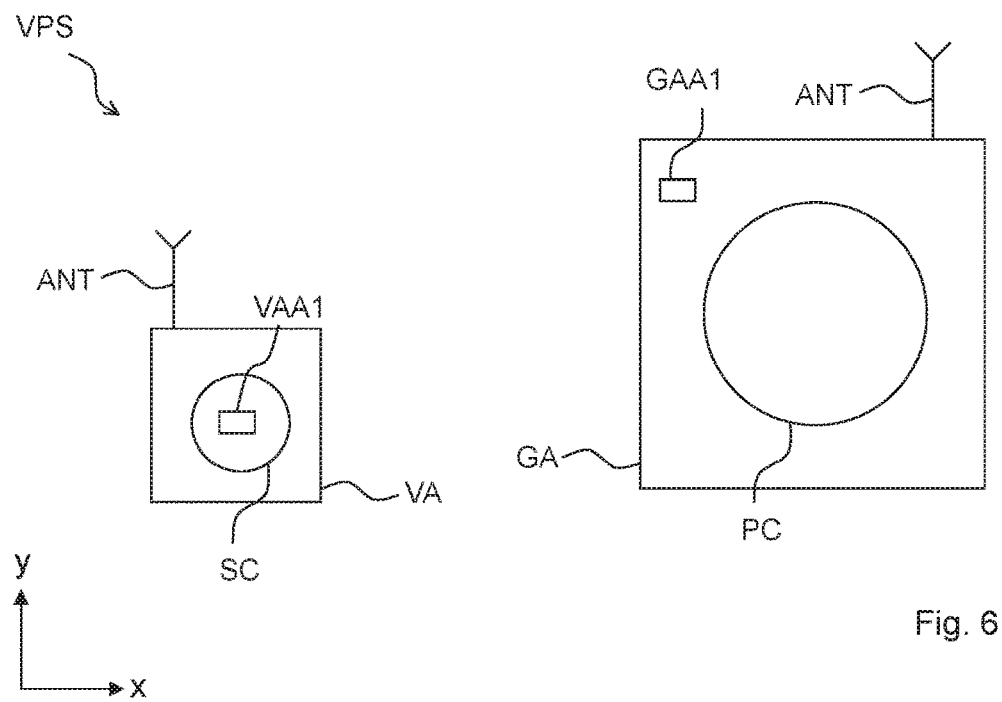
FIG. 6 shows the use of RF antennas.

FIG. 6 illustrates the possibility of providing RF antennas ANT to the vehicle assembly VA and/or to the ground assembly GA such that one of the two assemblies can communicate with the respective other assembly, e.g. for guiding the vehicle assembly VA to the ground assembly GA when the determination of the position and of the orientation is performed at the ground assembly GA.

Figure 7:
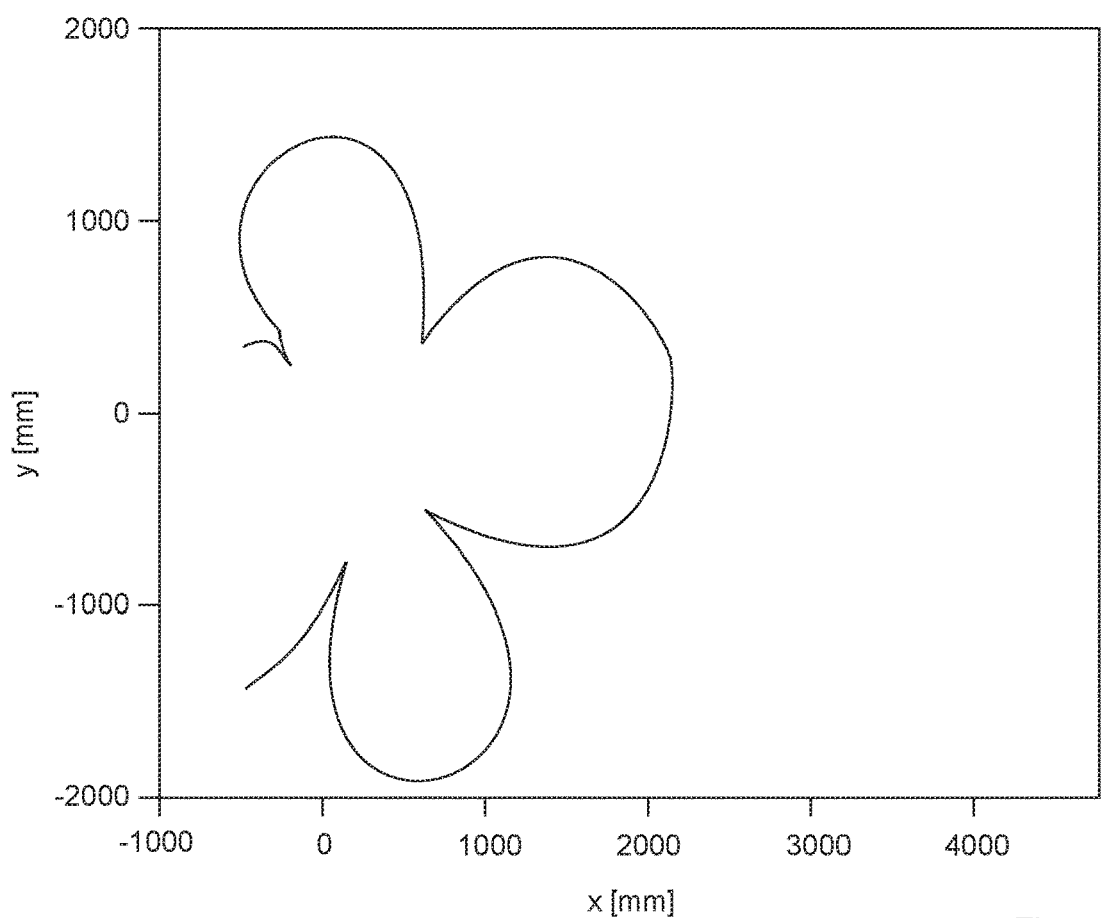
FIG. 7 illustrates the complexity of the to-be-processed data.

FIG. 7 illustrates a possible and asymmetric field strength distribution depending on a horizontal (x, y) distance.

Specifically, FIG. 7 illustrates the x, y positions of an exemplary magnetic field strength. The magnetic field strength distribution has a four-lobe shape. However, the shape of the lobes depends on the magnetic environment of the system. The magnetic environment of the system, e.g. the presence of magnetic materials, usually varies over time. Correspondingly, the field strength distribution is complex and time-dependent.

However, the use of a neural network allows a high accuracy despite the complexity, the lack of symmetry and the time dependence of the magnetic field strength distribution.

Figure 8:
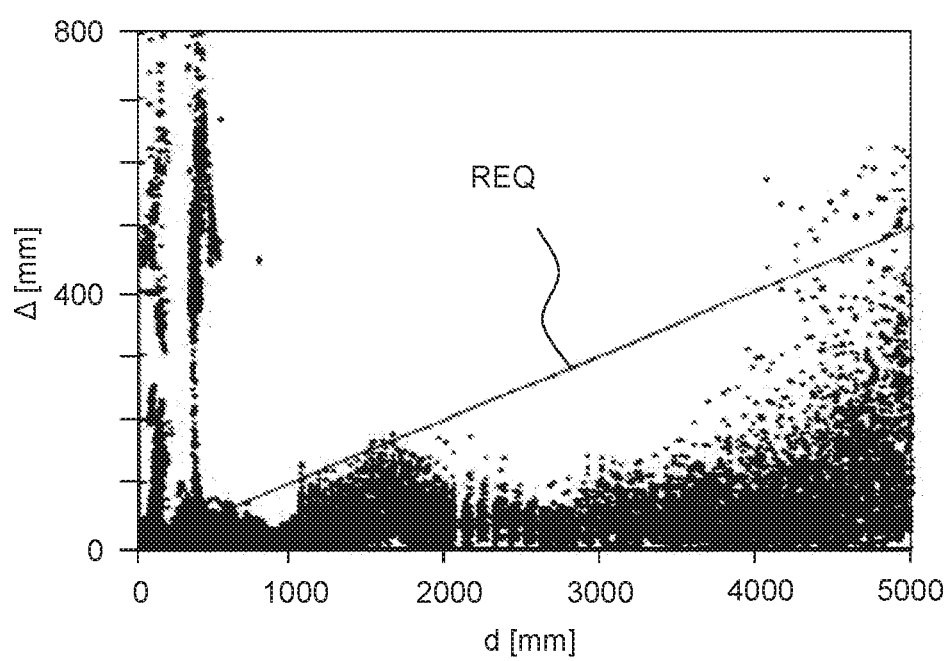
FIG. 8 illustrates the efficiency of a neural network-based vehicle positioning system.

FIG. 8 illustrates the performance of the corresponding positioning system utilizing a neural network for determining distances. Specifically, FIG. 8 illustrates the error Δ depending on the distance d between the ground assembly and the vehicle assembly. The line denoted REQ states the desired requirement of the position accuracy. For distances above 500 mm the average provided distance of the neural network is well within the required accuracy range.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A ground assembly for a vehicle positioning system, the ground assembly comprising:
   a first ground assembly antenna,
   wherein the ground assembly is configured to function together with a vehicle assembly of the vehicle positioning system to determine a position of the vehicle assembly relative to the ground assembly, and
   wherein a determination of the position is performed by utilizing a neural network.

2. The ground assembly of claim 1, further comprising a computer system providing the neural network.

3. The ground assembly of claim 2, wherein the computer system is an embedded system.

4. The ground assembly of claim 1, further comprising 1, 2, 3 or 4 additional ground assembly antennas.

5. The ground assembly of claim 1, wherein the first ground assembly antenna is magnetic antennas operating in a frequency range between 50 kHz and 150 KHz.

6. The ground assembly of claim 1, further comprising an RF antenna.

7. The ground assembly of claim 1, wherein the neural network is configured to provides best position information based on a Levenberg-Marquardt optimization.

8. The ground assembly of claim 1, further comprising a primary coil or a secondary coil.

9. The ground assembly of claim 8, wherein the primary coil or the secondary coil is selected from a spiral coil or a DD-coil.

10. A method for guiding the vehicle assembly to a vicinity of the ground assembly of claim 1, the method comprising:
    using the neural network for a close field magnetism triangulation; and
    using the neural network as a data approximation function.

11. A method for training the ground assembly of claim 1, the method comprising:
    training the neural network utilizing a Levenberg-Marquardt optimization; and
    performing a global optimization using a PSO.

12. A vehicle assembly for a vehicle positioning system, the vehicle assembly comprising:
    a first vehicle assembly antenna,
    wherein the vehicle assembly is configured to function together with a ground assembly of the vehicle positioning system to determine a position of the vehicle assembly relative to the ground assembly, and
    wherein a determination of the position is performed by utilizing a neural network.

13. The vehicle assembly of claim 12, further comprising a computer system providing the neural network.

14. The vehicle assembly of claim 13, wherein the computer system is an embedded system.

15. The vehicle assembly of claim 12, further comprising 1, 2, 3 or 4 additional vehicle assembly antennas.

16. The vehicle assembly of claim 12, wherein the first vehicle assembly antenna is a magnetic antennas operating in a frequency range between 50 kHz and 150 KHz.

17. The vehicle assembly of claim 12, further comprising an RF antenna.

18. The vehicle assembly of claim 12, wherein the neural network is configured to provides best position information based on a Levenberg-Marquardt optimization.

19. The vehicle assembly of claim 12, further comprising a primary coil or a secondary coil.

20. The vehicle assembly of claim 19, wherein the primary coil or the secondary coil is selected from a spiral coil or a DD-coil.

* * * * *